United States Patent
Gupta et al.

(10) Patent No.: US 11,946,901 B2
(45) Date of Patent: Apr. 2, 2024

(54) METHOD FOR DEGASSING LIQUID DROPLETS BY ELECTRICAL ACTUATION AT HIGHER TEMPERATURES

(71) Applicant: Nuclera Ltd, Cambridge (GB)

(72) Inventors: Tanya Gupta, Acton, MA (US); Luke M. Slominski, Sharon, MA (US); David Zhitomirsky, Woburn, MA (US); Richard J. Paolini, Jr., Framingham, MA (US)

(73) Assignee: Nuclera LTD, Cambridge (GB)

( * ) Notice: Subject to any disclaimer, the term of this patent is extended or adjusted under 35 U.S.C. 154(b) by 627 days.

(21) Appl. No.: 17/156,729

(22) Filed: Jan. 25, 2021

(65) Prior Publication Data
US 2021/0231606 A1    Jul. 29, 2021

Related U.S. Application Data

(60) Provisional application No. 62/966,162, filed on Jan. 27, 2020.

(51) Int. Cl.
  *G01N 27/447*    (2006.01)
  *B01D 19/00*    (2006.01)
  *B01L 3/00*    (2006.01)

(52) U.S. Cl.
  CPC ... *G01N 27/44704* (2013.01); *B01D 19/0063* (2013.01); *B01D 19/0073* (2013.01);
  (Continued)

(58) Field of Classification Search
  CPC ............. B01L 2400/0427; B01L 3/502; B01L 3/502784; B01L 3/502792; B01L 3/502715; B01L 2300/0645; B01L 2300/0883; B01L 2300/161; B01L 2300/1805; B01L 2300/18; B01L 2200/0678; B01L 2200/0673; G01N 13/00; G01N 27/44704; G01N 27/44791
  See application file for complete search history.

(56) References Cited

U.S. PATENT DOCUMENTS

| | | | |
|---|---|---|---|
| 3,813,519 A | 5/1974 | Jochin et al. | |
| 5,311,337 A | 5/1994 | McCartney, Jr. | |

(Continued)

FOREIGN PATENT DOCUMENTS

| | | |
|---|---|---|
| CN | 205003048 U | 1/2016 |
| JP | 2013076739 A | 4/2013 |

(Continued)

OTHER PUBLICATIONS

Abdelgawad, Mohamed et al., "The Digital Revolution: A New Paradigm for Microfluidics", Advanced Materials, vol. 21, pp. 920-925, (2009).

(Continued)

*Primary Examiner* — Gurpreet Kaur
(74) *Attorney, Agent, or Firm* — McCarter & English, LLP

(57) ABSTRACT

A method for degassing a microfluidic droplet by combining electrowetting and heating to induce formation of gaseous bubbles in the droplet. In an embodiment the methods are carried out on an active matrix of electrowetting electrodes including a hydrophobic coating. A carrier fluid is flowed against the droplet motion propelled by electrowetting to facilitate rapid removal of the gasses departing the droplet.

19 Claims, 5 Drawing Sheets

(52) U.S. Cl.
CPC .. *B01L 3/502715* (2013.01); *G01N 27/44791* (2013.01); *B01L 2300/18* (2013.01)

(56) References Cited

U.S. PATENT DOCUMENTS

| | | | |
|---|---|---|---|
| 5,964,995 A | 10/1999 | Nikiforov et al. | |
| 6,352,758 B1 | 3/2002 | Huang et al. | |
| 6,565,727 B1 | 5/2003 | Shenderov | |
| 6,773,566 B2 | 8/2004 | Shenderov | |
| 6,911,132 B2 | 6/2005 | Pamula et al. | |
| 6,967,489 B2 | 11/2005 | Brooks et al. | |
| 6,977,033 B2 | 12/2005 | Becker et al. | |
| 7,052,244 B2 | 5/2006 | Fouillet et al. | |
| 7,053,009 B2 | 5/2006 | Conley, Jr. et al. | |
| 7,163,612 B2 | 1/2007 | Sterling et al. | |
| 7,215,306 B2 | 5/2007 | Lo | |
| 7,328,979 B2 | 2/2008 | Decre et al. | |
| 7,420,549 B2 | 9/2008 | Jacobson et al. | |
| 7,458,661 B2 | 12/2008 | Kim et al. | |
| 7,504,709 B2 | 3/2009 | Masuda et al. | |
| 7,531,072 B2 | 5/2009 | Roux et al. | |
| 7,547,380 B2 | 6/2009 | Velev | |
| 7,641,779 B2 | 1/2010 | Becker et al. | |
| 7,733,559 B2 | 6/2010 | Kawase et al. | |
| 7,767,069 B2 | 8/2010 | Lee et al. | |
| 7,902,680 B2 | 3/2011 | Tano et al. | |
| 7,976,795 B2 | 6/2011 | Zhou et al. | |
| 8,093,064 B2 | 1/2012 | Shah et al. | |
| 8,128,798 B2 | 3/2012 | Adachi et al. | |
| 8,159,644 B2 | 4/2012 | Takatori | |
| 8,173,000 B1 | 5/2012 | Hadwen et al. | |
| 8,187,864 B2 | 5/2012 | Wheeler et al. | |
| 8,319,759 B2 | 11/2012 | Jacobson et al. | |
| 8,349,276 B2 | 1/2013 | Pamula et al. | |
| 8,388,909 B2 | 3/2013 | Pollack et al. | |
| 8,409,417 B2 | 4/2013 | Wu | |
| 8,460,528 B2 | 6/2013 | Pollack et al. | |
| 8,514,479 B2 | 8/2013 | Bae et al. | |
| 8,525,966 B2 | 9/2013 | Takatori | |
| 8,529,743 B2 | 9/2013 | Kim et al. | |
| 8,547,111 B2 | 10/2013 | Hadwen et al. | |
| 8,587,513 B2 | 11/2013 | Ozawa | |
| 8,593,438 B2 | 11/2013 | Komatsu et al. | |
| 8,603,413 B2 | 12/2013 | Fouillet | |
| 8,653,832 B2 | 2/2014 | Hadwen et al. | |
| 8,764,958 B2 | 7/2014 | Wang | |
| 8,791,891 B2 | 7/2014 | Van Dijk et al. | |
| 8,810,882 B2 | 8/2014 | Heikenfeld et al. | |
| 8,815,070 B2 | 8/2014 | Wang et al. | |
| 8,834,695 B2 | 9/2014 | Wang et al. | |
| 8,858,772 B2 | 10/2014 | Crane et al. | |
| 8,926,811 B2 | 1/2015 | Wu | |
| 8,936,708 B2 | 1/2015 | Feiglin et al. | |
| 8,940,147 B1 | 1/2015 | Bartsch et al. | |
| 8,958,044 B2 | 2/2015 | Takatori | |
| 8,993,348 B2 | 3/2015 | Wheeler et al. | |
| 8,994,705 B2 | 3/2015 | Jacobson et al. | |
| 9,061,262 B2 | 6/2015 | Vann et al. | |
| 9,216,414 B2 | 12/2015 | Chu | |
| 9,266,076 B2 | 2/2016 | Kim et al. | |
| 9,458,489 B2 | 10/2016 | Lim et al. | |
| 9,458,543 B2 | 10/2016 | Hadwen | |
| 9,476,811 B2 | 10/2016 | Mudrik et al. | |
| 9,517,469 B2 | 12/2016 | Shenderov et al. | |
| 9,594,056 B2 | 3/2017 | Fobel et al. | |
| 9,610,582 B2 | 4/2017 | Kapur et al. | |
| 9,623,407 B2 | 4/2017 | Delamarche et al. | |
| 9,649,632 B2 | 5/2017 | Van Dam et al. | |
| 9,714,463 B2 | 7/2017 | White et al. | |
| 9,815,056 B2 | 11/2017 | Wu et al. | |
| 9,815,061 B2 | 11/2017 | Delattre et al. | |
| 9,841,402 B2 | 12/2017 | Amos et al. | |
| 9,915,631 B2 | 3/2018 | Hoffmeyer et al. | |
| 9,983,169 B2 | 5/2018 | Bramanti | |
| 10,018,828 B2 | 7/2018 | Massard | |
| 10,325,131 B2* | 6/2019 | Akhavan Fomani | G06V 40/1306 |
| 10,486,156 B2 | 11/2019 | Campbell et al. | |
| 10,543,466 B2 | 1/2020 | Wu | |
| 10,646,454 B2 | 5/2020 | Liu et al. | |
| 10,882,042 B2 | 1/2021 | French | |
| 10,960,398 B2 | 3/2021 | Fobel et al. | |
| 2006/0039823 A1 | 2/2006 | Yamakawa et al. | |
| 2007/0023292 A1 | 2/2007 | Kim et al. | |
| 2008/0124252 A1 | 5/2008 | Marchand et al. | |
| 2010/0032293 A1 | 2/2010 | Pollack et al. | |
| 2010/0225611 A1 | 9/2010 | Lee et al. | |
| 2012/0273702 A1 | 11/2012 | Culbertson et al. | |
| 2013/0161193 A1 | 6/2013 | Jacobs et al. | |
| 2015/0075986 A1* | 3/2015 | Cyril | B01L 3/502715 204/450 |
| 2015/0377831 A1 | 12/2015 | Wheeler et al. | |
| 2016/0199832 A1 | 7/2016 | Jamshidi et al. | |
| 2016/0299101 A1* | 10/2016 | Pantoja | C12Q 1/686 |
| 2016/0312165 A1 | 10/2016 | Lowe, Jr. et al. | |
| 2017/0315090 A1 | 11/2017 | Wheeler et al. | |
| 2018/0221871 A1 | 8/2018 | Roberts | |
| 2019/0201902 A1 | 7/2019 | Fobel et al. | |
| 2019/0210026 A1 | 7/2019 | Jebrail et al. | |
| 2020/0064705 A1 | 2/2020 | Kayal et al. | |
| 2020/0089035 A1 | 3/2020 | Tsai et al. | |
| 2020/0114135 A1 | 4/2020 | Paolini, Jr. et al. | |
| 2020/0347840 A1 | 11/2020 | Paolini, Jr. et al. | |
| 2020/0348576 A1 | 11/2020 | Visani et al. | |

FOREIGN PATENT DOCUMENTS

| | | |
|---|---|---|
| KR | 10-2008-0011318 A | 2/2008 |
| TW | I271218 B | 1/2007 |
| TW | 200916823 A | 4/2009 |
| TW | I510295 B | 12/2015 |
| WO | 2007120241 A2 | 10/2007 |
| WO | 2016/166944 A1 | 10/2016 |
| WO | 2017075295 A1 | 5/2017 |

OTHER PUBLICATIONS

Choi, Kihwan et al., "Digital Microfluidics", Annu. Rev. Anal. Chem. 5:413-40 (2012).

Qi, Lin et al., "Mechanical-activated digital microfluidics with gradient surface wettability", Lab Chip, vol. 19, pp. 223-232, (2019).

Subramanian, R. Shankar et al., "Motion of a Drop on a Solid Surface Due to a Wettability Gradient", Langmuir, vol. 12, pp. 11844-11849, (2005).

Yu, Xi et al., "Surface Gradient Material: From Superhydrophobicity to Superhydrophilicity", Langmuir, vol. 22, pp. 4483-4486, (2006).

Ito, Yoshihiro et al., "The Movement of a Water Droplet on a Gradient Surface Prepared by Photodegradation", Langmuir, vol. 23, pp. 1845-1850, (2007).

Bhattacharjee, Biddut, "Study of Droplet Splitting in an Electrowetting Based Digital Microfluidic System", The University of British Columbia, Sep. 2012.

Cho, Sung Kwon et al., "Creating, Transporting, Cutting, and Merging Liquid Droplets by Electrowetting-Based Actuation for Digital Microfluidic Circuits", Journal of Microelectromechanical Systems, vol. 12, No. 1, Feb. 2003.

Nikapitiya, N. Y. Jagath B et al., "Accurate, consistent, and fast droplet splitting and dispensing in electrowetting on dielectric digital microfluidics", Mirco and Nano Systems Letters, vol. 5, No. 24, Jun. 2017.

Hadwen, B. et al., "Programmable large area digital microfluidic array with integrated droplet sensing for bioassays", Lab on a Chip, Issue 18, (2012).

Cooney, Christopher G. et al., "Electrowetting droplet microfluidics on a single planar surface", Microfluisics and Nanofluidics, vol. 2, Issue 5, pp. 435-446 (Sep. 2006).

Fouillet, Y. et al., "EWOD Digital Microfluidics for Lab on a Chip", International Conference on Nanochannels, Microchannels, and Minichannels, Paper No. ICNMM2006-96020, pp. 1255-1264, (Sep. 2008).

(56) References Cited

OTHER PUBLICATIONS

Nemani, Srinivasa Kartik et al., "Surface Modification of Polymers: Methods and Applications", Advanced Materials Interfaces, vol. 5, Issue 24, p. 1801247, Dec. 21, 2018.

Hitzbleck, Martina et al., "Reagents in microfluidics: an 'in' and 'out' challenge", Chem. Soc. Rev., vol. 42, p. 8494, (2013).

Walker, Shawn W. et al., "Modeling the Fluid Dynamics of Electro-Wetting on Dielectric (EWOD)", Journal of Microelectromechanical Systems, vol. 15, No. 4, pp. 986-1000, (Aug. 2006).

Li, Yiyan et al., "Improving the performance of electrowetting on dielectric microfluidics using piezoelectric top plate control", Sensors and Actuators B, vol. 229, pp. 63-74 (2016).

Barbulovic-Nad, Irena et al., "Digital microfluidics for cell-based assays", Lab Chip, vol. 8, pp. 519-526 (2008).

Newman, Sharon et al., "High density DNA storage library via dehydration with digital microfluidic retrieval", Nature Communications, vol. 10, No. 1706 (2019).

Dhindsa, Manjeet et al., "Virtual electrowetting channels: electronic liquid transport with continuous channel functionality", Lab on a Chip, Issue 7, pp. 832-836, (2010).

International Search Report and Written Opinion for Application No. PCT/US2021/014849, dated May 12, 2021, 8 pages.

Korean Intellectual Property Office, "International Search Report and Written Opinion", PCT/US2021/014849, dated May 12, 2021.

International Preliminary Report on Patentability for Application No. PCT/US2021/014849, dated Jul. 28, 2022, 5 pages.

\* cited by examiner

METHOD FOR DEGASSING LIQUID DROPLETS BY ELECTRICAL ACTUATION AT HIGHER TEMPERATURES

RELATED APPLICATIONS

This application claims priority to U.S. Provisional Patent Application No. 62/966,162, filed Jan. 27, 2020. All patents and publications disclosed herein are incorporated by reference in their entireties.

BACKGROUND

Microfluidics refers to the behavior, precise control, and manipulation of fluids that are geometrically constrained to a small scale (typically sub-millimeter) at which capillary penetration governs mass transport. It is a multidisciplinary field that involves engineering, physics, chemistry, biochemistry, nanotechnology, and biotechnology. It has practical applications in the design of systems that process low volumes of fluids to achieve multiplexing, automation, and high-throughput screening. Microfluidic structures include micropneumatic systems, i.e., microsystems for the handling of off-chip fluids (liquid pumps, gas valves, and the like), and digital microfluidic (DMF) devices for the on-chip handling of nanoliter (nl) and picoliter (pl) scale volumes.

DMF devices use independent electrodes to propel, split, and join droplets in a confined environment, thereby providing a "lab-on-a-chip." Digital microfluidic devices have been used to actuate a wide range of volumes (nL to µL) and are alternatively referred to as electrowetting on dielectric, or "EWoD," to further differentiate the method from competing microfluidic systems that rely on electrophoretic flow and/or micropumps. In electrowetting, a continuous or pulsed electrical signal is applied to a droplet, leading to switching of its contact angle. Liquids capable of electrowetting a hydrophobic surface typically include a polar solvent, such as water or an ionic liquid, and often feature ionic species, as is the case for aqueous solutions of electrolytes. A 2012 review of the electrowetting technology was provided by Wheeler in "Digital Microfluidics," *Annu. Rev. Anal. Chem.* 2012, 5:413-40. The technique allows sample preparation, assays, and synthetic chemistry to be performed with tiny quantities of both samples and reagents. In recent years, controlled droplet manipulation in microfluidic cells using electrowetting has become commercially viable, and there are now products available from large life science companies, such as Oxford Nanopore.

Typically, EWoD devices include a stack of an electrode, an insulating dielectric layer, and a hydrophobic layer providing a working surface. A droplet is placed on the working surface, and the electrode, once actuated, can cause the droplet to deform and wet or de-wet from the surface depending on the applied voltage. Most of the literature reports on EWoD involve segmented devices, whereby ten to several hundred electrodes are directly driven with a controller or controllers. While segmented devices are easy to fabricate, the number of electrodes is typically limited by space and wiring constraints. As there are more drive electrodes on a substrate, there are more control wires, and all of the wires have to be routed and connected for accurate performance. Accordingly, it is typically not possible to perform massive parallel assays, reactions, etc. in segmented devices. In comparison, "active matrix" devices (a.k.a. active matrix EWoD, a.k.a. AM-EWoD) devices can have many thousands, hundreds of thousands or even millions of addressable electrodes and provide a general purpose panel that can be used for many different applications.

In an EM-EWoD system, the drive electrodes are typically switched by thin-film transistors (TFTs), although electro-mechanical switches may also be used. TFT arrays are highly desirable for this application, due to having thousands of independently addressable drive pixels, thereby allowing mass parallelization of droplet procedures. Driver circuits can be integrated onto the AM-EWOD array substrate, and TFT-based electronics are well suited to the AM-EWOD application. TFTs can be made using a wide variety of semiconductor materials. A common material is silicon. The characteristics of a silicon-based TFT depend on the silicon's crystalline state, that is, the semiconductor layer can be either amorphous silicon (a-Si), microcrystalline silicon, or it can be annealed into polysilicon. TFTs based on a-Si are inexpensive to produce on a large scale, and relatively large substrate areas can be produced at relatively low cost. Combining AM-EWoD architecture with clocked controllers allows droplet motion to be pre-programed so that AM-EWoD arrays can be used as general purpose devices that allow great freedom for controlling multiple droplets and executing simultaneous analytical processes.

One of the recurring issues with analytical methods that include hundreds of liquid droplets, whether with micropneumatic, electrophoretic, or DMF devices, is that degassing small volumes of a liquid is quite challenging especially in instances where a droplet contains minute quantities of a biological sample. Traditional methods, such as freeze thawing, purging, or sonication, all present challenges including changes in sample concentration due to solvent evaporation, damage to biological molecules from sonication frequencies which typically fall in the kilohertz range, and sample contamination occurring while the sample is undergoing droplet degassing.

SUMMARY OF INVENTION

In one aspect of the invention, there is provided a method for degassing a microfluidic droplet. The method includes: (i) receiving a droplet in the microfluidic region of a microfluidic device, the device comprising: a bottom plate comprising a plurality of electrodes operatively coupled to a set of switches, and including a bottom hydrophobic layer. The hydrophobic layer covers the plurality of electrodes, and optionally the set of switches. The device additionally includes a top plate comprising a top electrode and a top hydrophobic layer covering the top electrode; a spacer separating the top and bottom plates, which creates a microfluidic region between the top plate and bottom plate; a controller operatively coupled to the set of switches and configured to provide an actuation voltage to at least a portion of the plurality of electrodes, and a heating element configured to provide thermal energy to at least a portion of the microfluidic region; and (ii) actuating at least one of the plurality of electrodes while directing thermal energy from the heating element to the microfluidic region, which, in turn, subjects the droplet to a combination of electrowetting and heating. The combined action of electrowetting and heating induces formation of gaseous bubbles in the droplet, which can be driven away from the droplet by motion of a surrounding fluid. In one embodiment, the method further includes moving the droplet along an electrode path in the microfluidic region to detach the bubbles from the droplet. In one embodiment, the method further includes moving the droplet along an electrode path in the microfluidic region to detach the bubbles from the droplet. In another embodiment, the method further includes flowing a carrier fluid in a direction opposite to the direction of motion of the droplet. In another embodiment, the method further includes flowing a carrier fluid in a direction perpendicular to the direction of motion of the droplet. In a non-exclusive embodiment, gaseous bubbles may first form within about 3 seconds to about 30 seconds, within about 3 seconds to about 15 seconds, or within about 3 seconds to about 10 seconds of heating and electrowetting. In another non-exclusive embodiment, the droplet may be heated to a temperature from about 50° C. to about 90° C., from about 60° C. to about 85° C., or from about 65° C. to about 80° C. In one embodiment, the droplet comprises a nucleic acid molecule, for example an oligonucleotide comprising 10 to 25 nucleotides. The bottom plate of the microfluidic device may include a dielectric layer between the bottom hydrophobic layer and the plurality of electrodes. The bottom hydrophobic layer may form a working surface in contact with the microfluidic region. In one embodiment, the switches are thin-film transistors. In another embodiment, the switches are electro-mechanical switches. The switches may be configured to operate at a potential of about 0 V to about 30 V.

In a second aspect of the invention, there is provided a system for degassing a droplet. The system includes: (i) a microfluidic device including: a bottom plate comprising a plurality of electrodes operatively coupled to a set of switches, and including a bottom hydrophobic layer covering both the plurality of electrodes and optionally the set of switches; a top plate comprising a top electrode and a top hydrophobic layer covering the top electrode; a spacer separating the top and bottom plates and creating a microfluidic region between the top plate and bottom plate; a controller operatively coupled to the set of switches and configured to provide an actuation voltage to at least a portion of the first plurality of electrodes, and a heating element configured to provide thermal energy to at least a portion of the microfluidic region; and (ii) a processor operably programmed to subject the droplet to a degassing method, the method including: actuating at least one of the plurality of electrodes and directing thermal energy from the heating element to the microfluidic region, to subject the droplet to combined electrowetting and heating, wherein the combined action of electrowetting and heating induces formation of gaseous bubbles in the droplet. In one embodiment, the processor is programmed to induce formation of gaseous bubbles within about 3 seconds to about 30 seconds of heating and electrowetting. In another embodiment, the processor is programmed to induce formation of gaseous bubbles within about 3 seconds to about 10 seconds of heating and electrowetting. The system may further include a pumping device configured to flow a carrier fluid in a direction opposite to the direction of motion of the droplet along an electrode path.

DEFINITIONS

Figure 1:
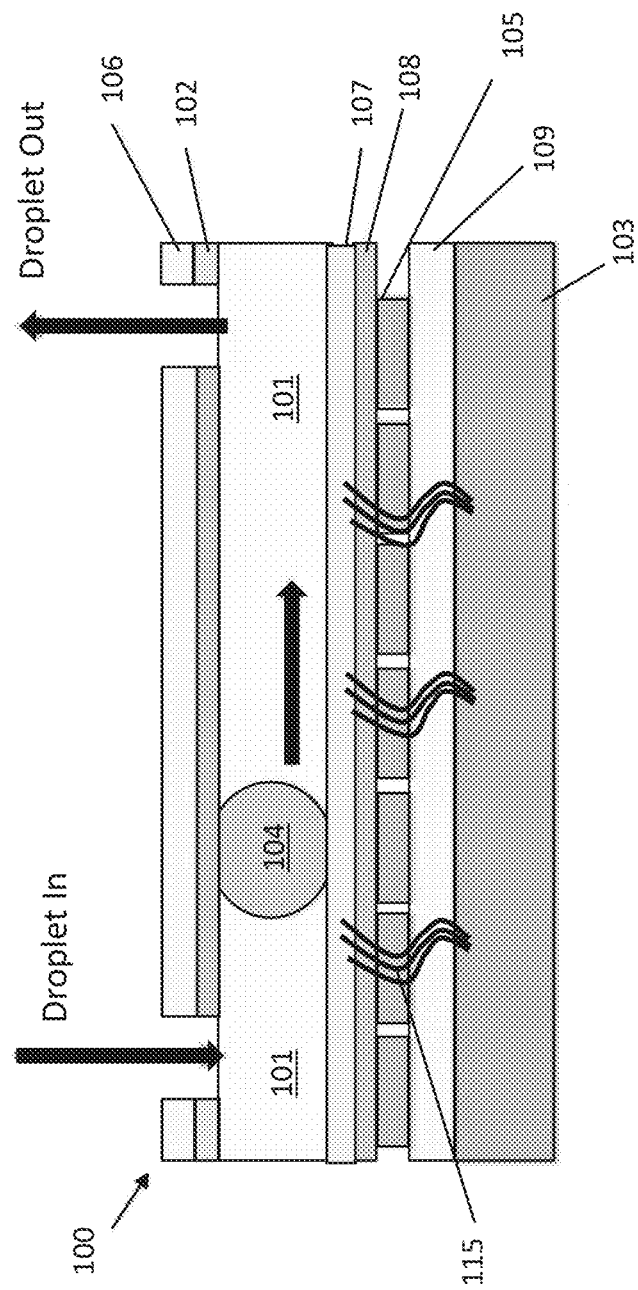
FIG. 1 is a schematic representation of a droplet undergoing degassing in a heated EWoD device.

Unless otherwise noted, the following terms have the meanings indicated.

"Actuate" with reference to one or more electrodes means effecting a change in the electrical state of the one or more electrodes which, in the presence of a droplet, results in a manipulation of the droplet.

"Droplet" means a volume of liquid that electrowets a hydrophobic surface and is at least partially bounded by carrier fluid. For example, a droplet may be completely surrounded by carrier fluid or may be bounded by carrier fluid and one or more surfaces of an EWoD device. Droplets may take a wide variety of shapes; non-limiting examples include generally disc shaped, slug shaped, truncated sphere, ellipsoid, spherical, partially compressed sphere, hemispherical, ovoid, cylindrical, and various shapes formed during droplet operations, such as merging or splitting or formed as a result of contact of such shapes with one or more working surface of an EWoD device. Droplets may include typical polar fluids such as water, as is the case for aqueous or non-aqueous compositions, or may be mixtures or emulsions including aqueous and non-aqueous components. The specific composition of a droplet is of no particular relevance, provided that it electrowets a hydrophobic working surface to an extent sufficient to enhance bubble formation in the presence of heating. In various embodiments, a droplet may include a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes. Moreover, a droplet may include one or more reagent, such as water, deionized water, saline solutions, acidic solutions, basic solutions, detergent solutions and/or buffers. Other examples of droplet contents include reagents, such as a reagent for a biochemical protocol, a nucleic acid amplification protocol, an affinity-based assay protocol, an enzymatic assay protocol, a gene sequencing protocol, a protein sequencing protocol, and/or a protocol for analyses of biological fluids. Further example of reagents include those used in biochemical synthetic methods, such as a reagent for synthesizing oligonucleotides finding applications in molecular biology and medicine, and/or one more nucleic acid molecules. The oligonucleotides may contain natural or chemically modified bases and are most commonly used as antisense oligonucleotides, small interfering therapeutic RNAs (siRNA) and their bioactive conjugates, primers for DNA sequencing and amplification, probes for detecting complementary DNA or RNA via molecular hybridization, tools for the targeted introduction of mutations and restriction sites in the context of technologies for gene editing such as CRISPR-Cas9, and for the synthesis of artificial genes.

"Droplet operation" means any manipulation of a droplet on a microfluidic device. A droplet operation may, for example, include: loading a droplet into the microfluidic device; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; cooling a droplet; disposing of a droplet; transporting a droplet out of a microfluidic device; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations that are sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to volume of the resulting droplets (i.e., the volume of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations include microdialysis loading, pressure assisted loading, robotic loading, passive loading, and pipette loading. Droplet operations may be electrode-mediated. In some cases, droplet operations are further facilitated by the use of hydrophilic and/or hydrophobic regions on surfaces and/or by physical obstacles.

"Nucleic acid molecule" is the overall name for DNA or RNA, either single- or double-stranded, sense or antisense. Such molecules are composed of nucleotides, which are the monomers made of three moieties: a 5-carbon sugar, a phosphate group and a nitrogenous base. If the sugar is a ribosyl, the polymer is RNA (ribonucleic acid); if the sugar is derived from ribose as deoxyribose, the polymer is DNA (deoxyribonucleic acid). Nucleic acid molecules vary in length, ranging from oligonucleotides of about 10 to 25 nucleotides which are commonly used in genetic testing, research, and forensics, to relatively long or very long prokaryotic and eukaryotic genes having sequences in the order of 1,000, 10,000 nucleotides or more. Their nucleotide residues may either be all naturally occurring or at least in part chemically modified, for example to slow down in vivo degradation. Modifications may be made to the molecule backbone, e.g. by introducing nucleoside organothiophosphate (PS) nucleotide residues. Another modification that is useful for medical applications of nucleic acid molecules is 2' sugar modifications. Modifying the 2' position sugar is believed to increase the effectiveness of therapeutic oligonucleotides by enhancing their target binding capabilities, specifically in antisense oligonucleotides therapies. Two of the most commonly used modifications are 2'-O-methyl and the 2'-Fluoro.

When a liquid in any form (e.g., a droplet or a continuous body, whether moving or stationary) is described as being "on", "at", or "over an electrode, array, matrix or surface, such liquid could be either in direct contact with the electrode/array/matrix/surface, or could be in contact with one or more layers or films that are interposed between the liquid and the electrode/array/matrix/surface.

When a droplet is described as being "on" or "loaded on" a microfluidic device, it should be understood that the droplet is arranged on the device in a manner which facilitates using the device to conduct one or more droplet operations on the droplet, the droplet is arranged on the device in a manner which facilitates sensing of a property of or a signal from the droplet, and/or the droplet has been subjected to a droplet operation on the droplet actuator.

DETAILED DESCRIPTION

In a first aspect, the present invention provides a method of degassing liquids, and in particular, small volume droplets of liquids that can electrowet the working surface of a microfluidic device. When subjected to the combined action of an electrowetting field and heating, gaseous impurities rapidly nucleate and coalesce into bubbles. Upon effervescence, the degassed droplet may be separated from the gas bubbles via selective electrode actuation or some other flow technique that moves the droplet away from the gas bubbles or vice versa. The method is capable of handling very small sample sizes and is well-suited to applications in the life sciences, for example in the manipulation of minute amounts of aqueous solutions of biological and pharmaceutical samples. In many instances, the degassing starts within a few seconds of reaching degassing temperature and the droplet is significantly degassed within 15 minutes or less. Conveniently, degassing and separation of the degassed droplet from the evolved gasses may be performed simultaneously, resulting in an even faster, simpler process. Additionally, there is no need to apply a vacuum to remove gaseous impurities, and the method is conducted at much lower frequencies as compared to sonication, thereby preserving the integrity of fragile biological samples, e.g., proteins, cell fragments, or organelles.

This aspect of the invention is based on the finding that a simultaneous application of an electric field (i.e., an electrowetting field) and heating promotes and accelerates the removal of gas from an electrowetting liquid. Without wishing to be bound to any particular theory, it appears that the change in contact angle induced by the electric field acts in synergy with the drop in gas solubility commonly associated with temperature increases, thus resulting in a faster and fuller nucleation of gaseous impurities into bubbles. In most instances, heating alone was insufficient to induce suitable bubble formation, and a side-by-side comparison of degassing with, and without, application of the electrowetting field suggest that nucleation does not happen, or happens at a much reduced rate, without application of the electrowetting field.

Heated EWoD Devices

In one embodiment, the degassing method may be carried out on an EWoD device. The fundamental structure of an exemplary EWoD device is illustrated in the cross-sectional image of FIG. 2. EWoD 200 includes a spacer filled with carrier fluid 201 and at least one droplet 204. The carrier fluid is sufficiently immiscible with a droplet phase to render the droplet phase subject to electrode-mediated droplet operations. The carrier fluid may include a low viscosity, hydrophobic liquid, such as silicon oil, optionally doped with a surfactant. The spacer forms a microfluidic region between a top plate and a bottom plate. As depicted herein, the "bottom" plate includes a plurality of electrodes to propel various droplets through the microfluidic region. The "top" plate includes a singular top electrode although embodiments featuring a second plurality of electrodes located on the top plate are also contemplated, for example to provide a signal and/or to detect the presence and/or size and/or composition of a droplet with capacitive sensing. The use of "top" and "bottom" is merely a convention as the locations of the two plates can be switched, and the device can be oriented in a variety of ways, for example, the top and bottom plates can be roughly parallel while the overall device is oriented so that the substrates are normal to a work surface (as opposed to parallel to the work surface as shown in the figures).

Heating elements specifically engineered for microfluidic devices are known in the art, as exemplified in US Patent Appl. Publication No. 2018/0221871 to Roberts, and may include resistive heaters incorporated in combination with materials of different thermal resistance to alter the heat flow to different regions of the device. Heating energy may also be provided in the form of infrared radiation (IR), applied in the form of microwave radiation, or transferred from a heat source to the microfluidic region by natural or forced convection of a heating fluid flowing through suitable tubing. In one embodiment, resistive heating tape is affixed to the backside of a glass substrate upon which an active matrix of pixel electrodes has been fabricated. In some embodiments, the heating device may be affixed to the electrowetting device with a conductive paste in order to improve heat transfer. In another embodiment, resistive heating tape may be coupled to the top plate of the EWoD device.

Figure 2:
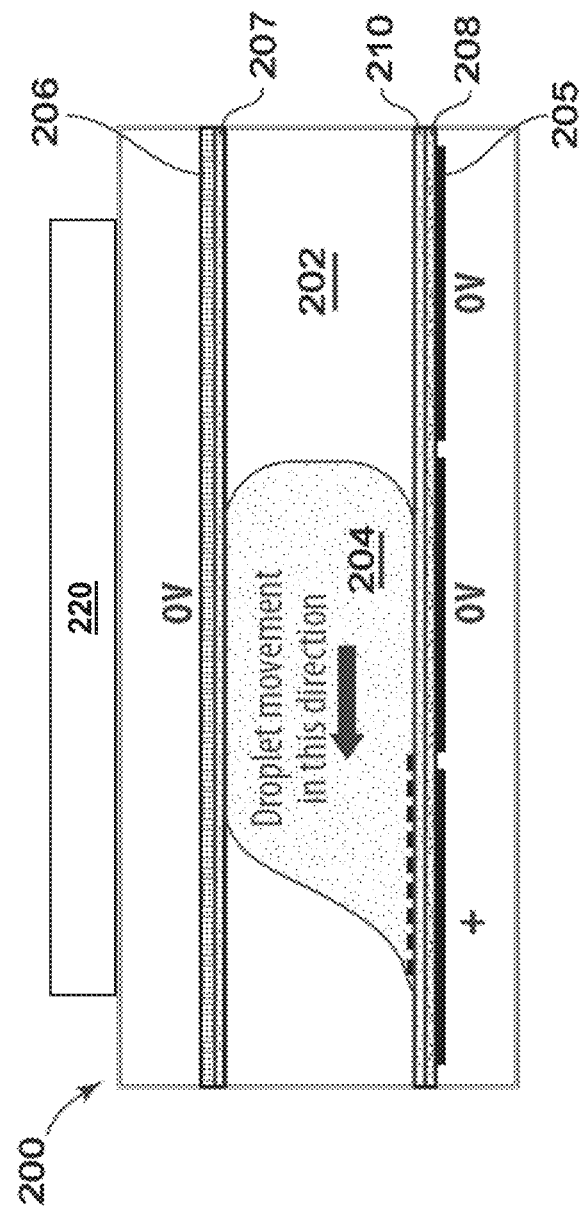
FIG. 2 illustrates the fundamental structure of an exemplary EWoD device.

The height of the microfluidic region is typically in the range 50 to 200 μm, but can be larger. In a basic configuration, as shown in FIG. 2, a plurality of propulsion electrodes 205 are patterned on the bottom substrate and a singular top electrode 206 is disposed on the opposing surface. The device additionally includes hydrophobic layers 207 and 210 forming top and bottom working surfaces contacting the spacer, as well as a dielectric layer 208 between the propulsion electrodes 205 and the bottom hydrophobic layer 210. (The upper substrate may also include a dielectric layer, but it is not shown in FIG. 2). The hydrophobic layer is typically 20 to 60 nm thick and prevents the droplet from wetting the surface. While it is possible to have a single layer for both the dielectric and hydrophobic functions, such layers typically require thick inorganic layers (to prevent pinholes) with resulting low dielectric constants, thereby requiring more than 100V for droplet actuation. To achieve low voltage actuation, it is better to have a thin inorganic layer for high capacitance and to be pinhole free, topped by a thin organic hydrophobic layer. With this combination it is possible to have electrowetting operation with voltages in the range +/−10 to +/−50V, which is in the range that can be supplied by conventional thin-film transistor (TFT) arrays. In order to implement the methods of the invention, a heating device 220 may be added above or below the droplet work surface, as shown in FIG. 2.

Hydrophobic Working Surfaces

Working surfaces of certain EWoD devices may be made from hydrophobic materials or may be coated or treated to make them hydrophobic. Hydrophobic materials may be formed into coatings by deposition onto a surface via suitable techniques, to form hydrophobic layers. Depending on the hydrophobic material to be applied, example deposition techniques include spin coating, molecular vapor deposition, and chemical vapor deposition. Hydrophobic layers may be more or less wettable as usually defined by their respective contact angles. Unless otherwise specified, angles are herein measured in degrees (°) or radians (rad), according to context. For the purpose of measuring the hydrophobicity of a surface, the term "contact angle" is understood to refer to the contact angle of the surface in relation to deionized (DI) water. If water has a contact angle between 0°<θ<90°, then the surface is classed as hydrophilic, whereas a surface producing a contact angle between 90°<θ<180° is considered hydrophobic. Usually, moderate contact angles are considered to fall in the range from about 90° to about 120°, while high contact angles are typically considered to fall in the range from about 120° to about 150°. In instances where the contact angle is 150°<θ then the surface is commonly known as superhydrophobic or ultrahydrophobic. Surface wettabilities may be measured by analytical methods well known in the art, for instance by dispensing a droplet on the surface and performing contact angle measurements using a contact angle goniometer. Anisotropic hydrophobicity may be examined by tilting substrates with gradient surface wettability along the transverse axis of the pattern and examining the minimal tilting angle that can move a droplet.

Hydrophobic layers of moderate contact angle typically include one or a blend of fluoropolymers, such as PTFE (polytetrafluoroethylene), FEP (fluorinated ethylene propylene), PVF (polyvinylfluoride), PVDF (polyvinylidene fluoride), PCTFE (polychlorotrifluoroethylene), PFA (perfluoroalkoxy polymer), FEP (fluorinated ethylenepropylene), ETFE (polyethylenetetrafluoroethylene), and ECTFE (polyethylenechlorotrifluoroethylene). Commercially available fluoropolymers include Cytop® (AGC Chemicals, Exton, Pa.) and Teflon® AF (Chemours, Wilmington, Del.). An advantage of fluoropolymer films is that they can be highly inert and can remain hydrophobic even after exposure to oxidizing treatments such as corona treatment and plasma oxidation.

Electrowetting

When no voltage differential is applied to the electrodes, a droplet of a polar composition will tend to maintain a spheroidal shape to minimize contact with the hydrophobic surfaces (carrier fluid and hydrophobic layer). When an electrode is actuated, an electric field is generated between it and the single top electrode. The electric field creates a surface tension (ST) gradient that causes a droplet overlapping the actuated electrode to move towards that electrode. EWoD uses the electrocapillary principle: ST is a function of electric potential across an interface, and the change in liquid-solid ST, $\gamma_{SL}$, changes the contact angle at the liquid-solid-gas interfaces. When a voltage, V, is applied between the liquid and electrode, surface energy is balanced by electrical energy, and $\gamma_{SL}$ is lowered, as expressed in Lippmann's equation (equation 1). Young's (equation 2) relates contact angle and ST, and Lippmann-Young's (equation 3) relates contact angle to voltage (Cho et al., 2002, The Fifteenth IEEE International Conference on Micro Electro Mechanical Systems, pp. 32-35):

$$\gamma_{SL} = \gamma_0 - \frac{1}{2}cV^2 \quad (1)$$

$$\gamma_{SL} = \gamma_{SG} - \gamma_{LG}\cos\theta \quad (2)$$

$$\cos\theta_v = \cos\theta_0 + \frac{1}{2}\frac{c}{\gamma_{LG}} \quad (3)$$

Where:
V=Voltage between liquid and electrolyte
c=Capacitance of dielectric layer
$\gamma_{SL}$=Surface Tension (ST) at solid and liquid interface
$\gamma_{SG}$=ST at solid and gas interface
$\gamma_{LG}$=ST at liquid and gas interface
$\gamma_0=\gamma_{SL}$ when V=0
$\theta_0$=Contact angle when V=0

Charge accumulates at the solid-liquid interface, and the surface wettability of bottom layer 210 is modified from hydrophobic to hydrophilic by applying a voltage between the liquid and an electrode under the hydrophobic and other layers. It can be seen that the EWoD actuation mechanism is such that the contact angle of the liquid droplet with the working surface depends on the square of the actuation voltage; the sign of the applied voltage is unimportant to first order. It is thus possible to implement EWoD with either an AC or a DC drive scheme.

The change in contact angle may also be used to induce motion in the droplet, leaving gas bubbles behind. When a voltage differential is applied between adjacent electrodes, the voltage on one electrode attracts opposite charges in the droplet at the dielectric-to-droplet interface, and the droplet moves toward this electrode, also as illustrated in FIG. 2. Hence, migration of the droplet in one or more directions may be achieved with the appropriate electrode actuation pattern. The voltages needed for acceptable droplet propulsion largely depend on the properties of the dielectric. AC driving is used to reduce degradation of the droplets, dielectrics, and electrodes by various electrochemistries. Operational frequencies for EWoD can be in the range 100 Hz to 1 MHz, but lower frequencies of 1 kHz or lower are preferred for use with TFTs that have limited speed of operation.

Returning to FIG. 2, the top electrode 206 is a single conducting layer normally set to zero volts or a common voltage value (VCOM) to take into account offset voltages on the propulsion electrodes 205 due to capacitive kickback from the TFTs that are used to switch the voltage on the electrodes (see FIG. 2). The top electrode can also have a square wave applied to increase the voltage across the liquid. Such an arrangement allows lower propulsion voltages to be used for the TFT connected propulsion electrodes 205 because the top plate electrode 206 voltage is additional to the voltage supplied by the propulsion electrodes 205.

Figure 3:
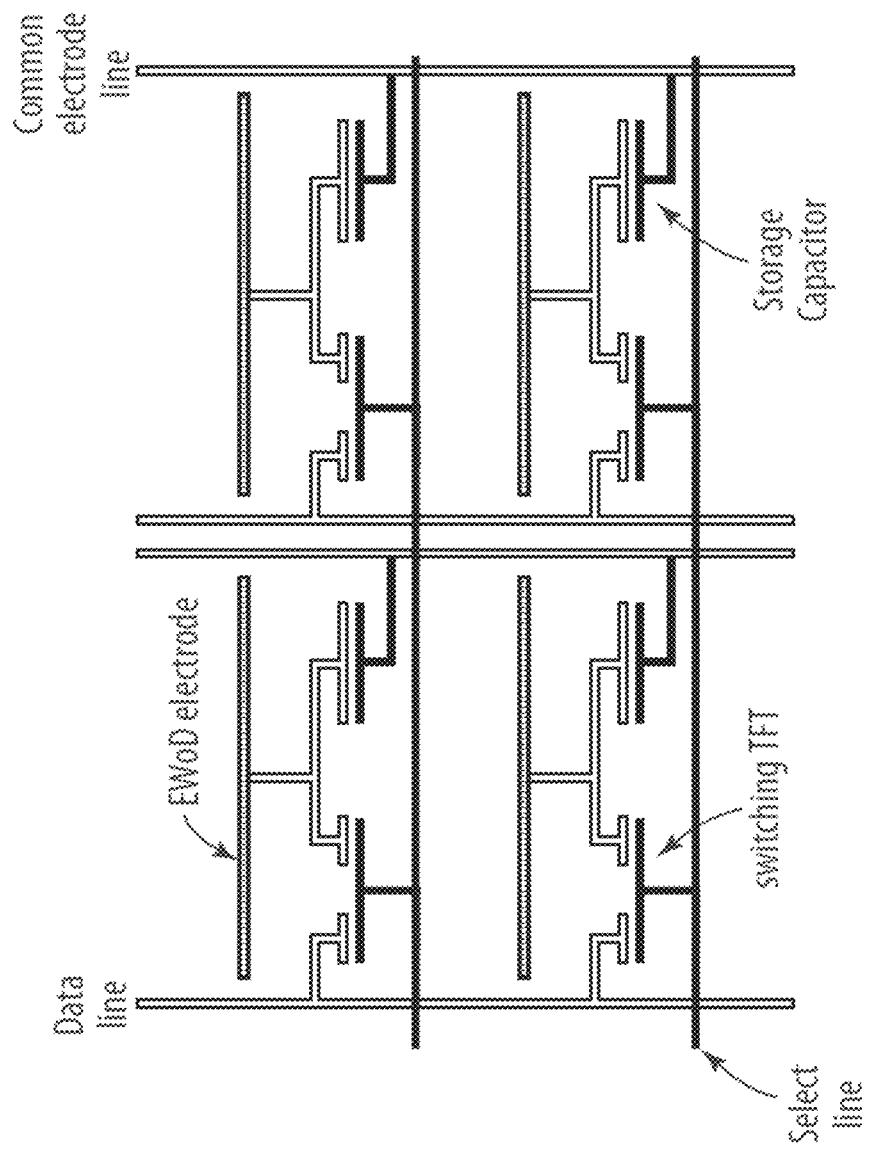
FIG. 3 is a schematic representation of an active propulsion electrode matrix controlled via thin-film-transistors (TFTs).

As shown in FIG. 3, an active matrix of propulsion electrodes can be arranged to be driven with data and gate (select) lines much like an active matrix in a liquid crystal display. Each element of the electrode matrix contains a matrix element circuit for controlling the electrode potential of a corresponding electrode. The gate (select) lines are scanned for line-at-a time addressing, while the data lines carry the voltage to be transferred to propulsion electrodes for electrowetting operation. If no movement is needed, or if a droplet is meant to move away from a propulsion electrode, then 0 V will be applied to that (non-target) propulsion electrode. If a droplet is meant to move toward a propulsion electrode, an AC voltage will be applied to that (target) propulsion electrode.

Degassing Device Structures

Illustrated in the cross-sectional image of FIG. 1 is an example degassing EWoD structure featuring an array of propulsion electrodes 105 disposed on substrate 109 and a singular top electrode 106 disposed on the opposing surface. The device additionally includes top and bottom hydrophobic layers 102 and 107 forming working surfaces in contact with the carrier fluid layer 101, as well as a dielectric layer 108 between the propulsion electrodes 105 and bottom hydrophobic layer 107. A sample droplet 104 is introduced through an inlet opening across the top plate, to enter the spacer of the EWoD structure at a location on bottom hydrophobic layer 107. There, heating element 103 provides thermal energy 115 to the droplet, leading to an increase in temperature. At the same time, the electrode(s) overlapped by the droplet are actuated, pulling the droplet down onto the electrode, lowering its contact angle and increasing the droplet contact area.

It is surmised that gas bubbles are nucleated under the combined action of the applied voltage and heating. The bubbles do not appear to interact with the electric field(s) generated by the EWoD device, and can therefore be pushed to the side by the moving droplet and left behind. To this end, the droplet may be set in motion with an actuation pattern along an electrode path until the bubbles have detached. The path may linear, and the droplet trace a periodic, up-and-down or back-and-forth motion until degassing is completed. In another embodiment, the path may be parallelogram-like, e.g., a square, rectangular, or rhombic, or have any open or closed geometry, such as serpentine, spiral, or zig-zag, depending on and compatible with the application at hand. Such patterns are trivial on a large matrix of propulsion electrodes.

The extent of electrowetting may be expressed in terms of contact angle changes exhibited by the droplet upon electrode actuation. Thus, if $\theta_1$ is the contact angle in the absence of an electric field, and $\theta_2$ is that attained once the electrode is brought to a voltage V, then $\Delta\theta=\theta_1-\theta_2$ may be used as metric for quantifying the resulting change in surface tension. As outlined above by reference to Lippmann-Young's (equation 3), the contact angle at a given dielectric layer capacitance is inversely proportional to voltage, so quantity $\Delta\theta$ is directly proportional to the potential of electrode actuation. Ideally, steeper contact angle drops, that is, greater values of $\Delta\theta$, would be preferable in that they usually result in faster and fuller purging of gases from the sample. By way of example, the $\Delta\theta$ resulting from electrowetting may be such that $\theta_2$ is smaller than 90°, that is, a contact angle that is typically considered that of a hydrophilic surface. However, care should be taken that applied electrowetting voltages do not reach or exceed values that may be prejudicial to the integrity or properties of the sample, for instance by inducing unwanted electrochemical reactions or deleterious tertiary structure rearrangements in large biomolecules. In one exemplary embodiment, a $\Delta\theta$ between about 30° to about 120° is achieved. In another embodiment, $\Delta\theta$ is from about 45° to about 105°. In a further embodiment, AO falls in the range from about 60° to about 90°.

As the temperature increases, the solubility of a gas decreases, so the temperature reached by the droplet on heating should be sufficiently high as to maximize degassing. In one exemplary embodiment, the droplet is heated to a temperature from about 50° C. to about 90° C. In another embodiment, the temperature of heating falls in the range between 60° C. to 85° C. In a further embodiment, the heating brings the droplet to a temperature from about 65° C. to 80° C. On the other hand, the nature of the molecules and aggregates present in the droplet ought to be taken in consideration, lest excessive heating lead to the denaturation or degradation of relevant species and supramolecular constructs such as multi-protein complexes.

More broadly, synergistic voltage-temperature-time profiles can be developed to suit the composition of the droplet at hand and accomplish a satisfactory level of degassing while preserving the chemical and structural integrity of its sample contents. For instance, a droplet containing a protein complex susceptible to denaturation at temperatures approaching or exceeding 90° C. or may be degassed at a lower temperature. The drop in gas effervescence due to the lower temperature can be offset by electrowetting the droplet, thereby ensuring degassing completion within time frames attained at 70° C., but at lower temperatures. Similarly, further drops in degassing temperature may be at least partially offset by further increases in the electrowetting voltage, thereby safeguarding the speed and efficiency of the degassing process.

The performance of degassing methods according to the invention may be measured by recording the time of first bubble formation and comparing it to that obtained in the presence of heating alone. By this metric, one can easily determine the effectiveness of a given heating and electrode actuation pattern. In a first, non-exclusive embodiment, bubbles are first formed within about 3 to about 30 seconds of the combined application of heating and voltage. In another embodiment, bubbles are first detected within about 3 to about 15 seconds. In a further embodiment, bubble formation is first noticed within about 3 to about 10 seconds of the combined application of heating and voltage. Degassing is usually complete within about 1 to about 15 minutes, after which the formation of bubbles is minimal or nonexistent. In a representative embodiment, degassing is complete within about 2 to about 10 minutes. In a further embodiment, degassing is complete within 3 to 7 minutes.

The structure may be fitted with a processor operatively linked to the controller and heater that is programmed to subject droplets to a number of voltage-heating profiles, where each profile is specifically developed for a particular type of droplet composition. To that end, the processor can be configured to control actuation voltages and heat flows individually tailored to each composition. The electronics of the processor may include suitable circuitry and memorized instructions that are configured to carry out various operations relating to control of the EWoD device, such as a CPU, microcontroller or microprocessor.

Figure 4:
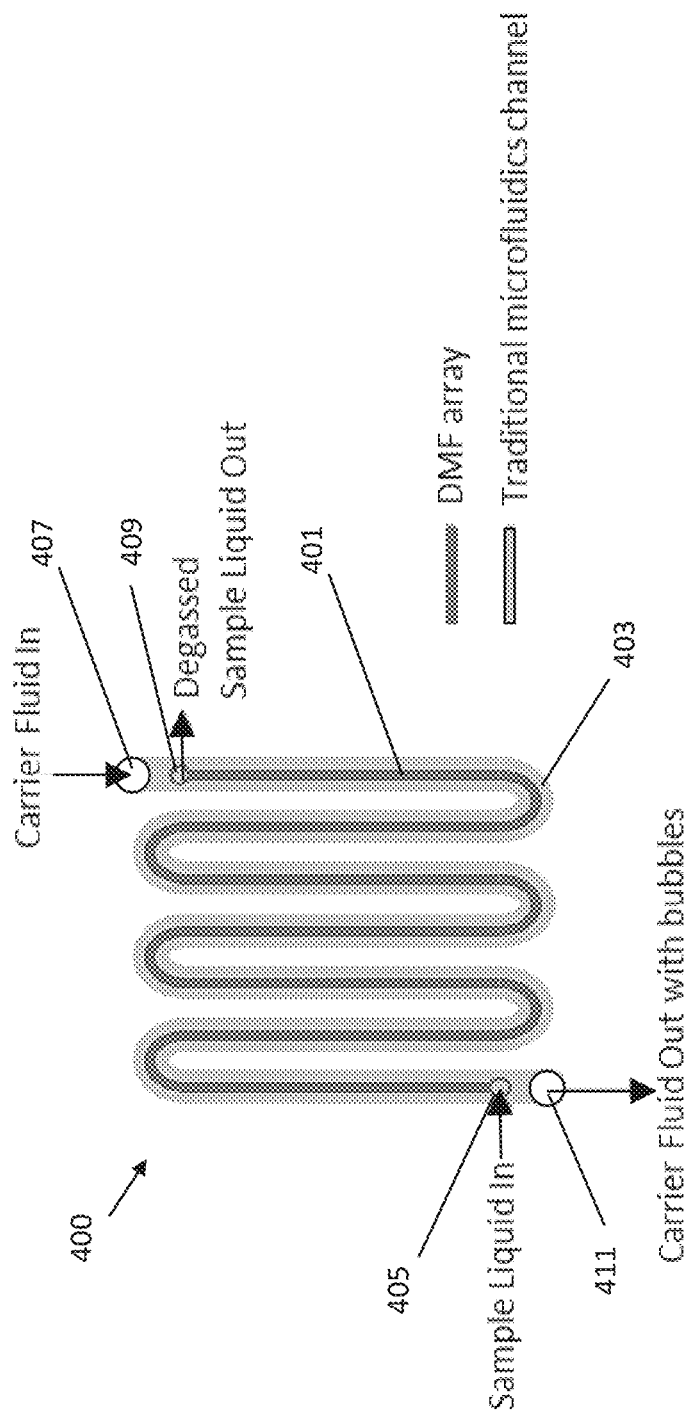
FIG. 4 is a schematic representation of a device for degassing droplets in the presence of a carrier fluid counterflow.

To further enhance gas removal, a carrier fluid may be set to flow in a direction opposite to that of the moving droplet, or transverse or perpendicular, provided that the fluid flow moves the degassed bubbles away from the droplet. In one embodiment, carrier fluid flow may be achieved by adding a pumping device, such as a syringe, a peristaltic pump, a micro-pump, a piston pump, or compressed-air driven flow using pressure/flow controllers, to the EWoD structure of FIG. 1. In another embodiment, and as illustrated in the top-view schematic representation of FIG. 4, a device 400 includes an EWoD electrode array 401 contained within serpentine microfluidic channel 403. A sample droplet is introduced into the channel through sample inlet 405 and placed onto the working surface covering the electrodes. There, it undergoes heating (heating elements not shown) and is made to advance along the serpentine microfluidic channel by actuation of the array electrodes. As the droplet is heated and moves upon actuation, its gaseous impurities nucleate and coalesce into bubbles. Simultaneously, the carrier fluid is pressure-driven into the channel through carrier fluid inlet 407 to flow in an opposite direction to the moving droplet. This allows for a continuous degassing process that reaches completion when the degassed sample droplet reaches sample outlet 409 and the carrier fluid with the bubbles exits through carrier fluid outlet 411. The sample droplet outlet can be connected to other microfluidic devices for further downstream processing.

Optionally, a gas-permeable membrane may partition microfluidic channel 403 into a first conduit containing the droplet and a second conduit where the carrier fluid is flowed. This arrangement allows for gaseous impurities to permeate from the droplet to the carrier fluid while preventing direct physical contact between the two, thereby preventing the flowing carrier fluid from slowing down the droplet or even blocking it from migrating along the electrode array.

EXAMPLE

An example EWoD device was fabricated by forming a bottom plate with an active matrix of 10 nm thick molybdenum electrodes on a glass substrate, controlled by a commercial image driver chip (UltraChip). The electrodes were coated with a 100 nm stack of alumina, hafnium oxide and tantalum oxide dielectric layer topped with a 100 nm hydrophobic layer of Teflon® AF-1600 (Chemours, Wilmington Del.). A top plate featuring a transparent indium tin oxide (ITO) electrode was separated from the bottom plate with a 150 µm spacer, creating a microfluidic region that was filled with dodecane as carrier fluid. The driver chip was coupled to an exterior drive controller (E Ink Corporation Hulk controller) and a series of "images" were provided that resulted in the desired droplet actuation.

Figure 5:
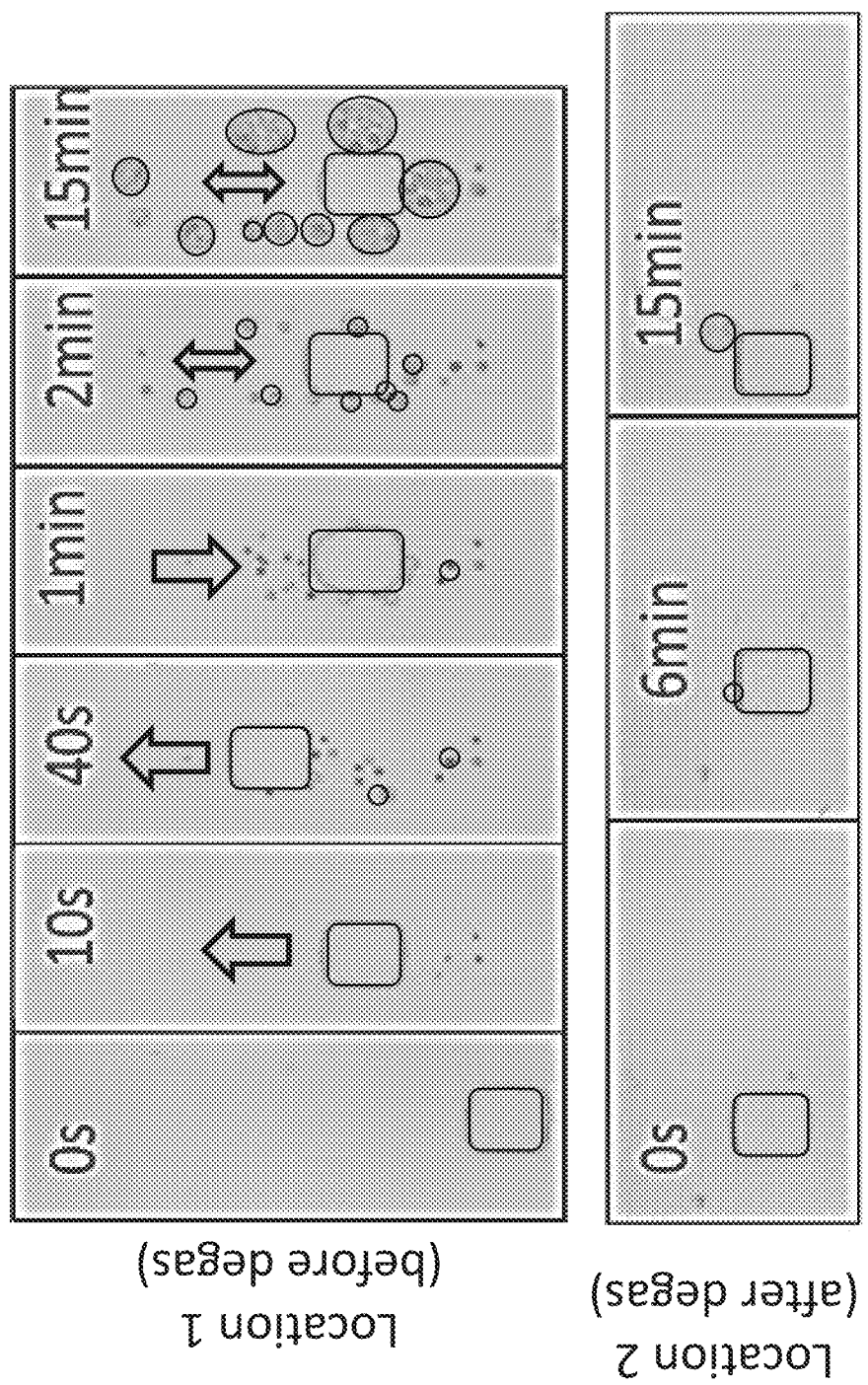
FIG. 5 includes pictures of a droplet undergoing degassing when subjected to simultaneous heating and electrode actuation.

A droplet of an aqueous solution containing 0.05 wt % surfactant Tween® 20 (Croda, Edison, N.J.) was introduced in the microfluidic region and subjected to heating at 80° C. (hot plate—Fisher Scientific) together with electrode actuation at 30 V. As illustrated in FIG. 5, in the course of up-and-down reciprocal motion at 'Location 1', bubbles were generated within a few seconds which grew in size and number over the 15 minutes of actuation. When the same droplet was moved to new 'Location 2' and subjected to reciprocal motion in a back-and-forth orientation, bubble generation of significantly lesser magnitude was attained.

Without being bound to any particular theory, these results show that the bubbles were most likely derived from gaseous impurities present in the original droplet, rather than having formed following heating of the droplet. Evaporation due to heating was likely not have occurred because the droplet did not form bubbles when heated in the absence of electric potentials. Similarly, degassing of one or more components of the device was not probable because no bubble formation was observed when heating and electric actuation were applied in the absence of aqueous droplets. Lastly, the formation of gaseous products from electrochemical reactions cannot be completely ruled out, but it most unlikely as degassing reduces after continued actuation, rather than increase or at least hold steady.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:
1. A method for degassing a microfluidic droplet, the method comprising:
   (i) receiving a droplet in a microfluidic region of a microfluidic device, the microfluidic device comprising:
      a bottom plate comprising a plurality of electrodes operatively coupled to a set of switches, and including a bottom hydrophobic layer covering the plurality of electrodes;
      a top plate comprising a top electrode and a top hydrophobic layer covering the top electrode;
      a spacer separating the top and bottom plates and creating a microfluidic region between the top plate and bottom plate;

a controller operatively coupled to the set of switches and configured to provide an actuation voltage to at least a portion of the plurality of electrodes, and a heating element configured to provide thermal energy to at least a portion of the microfluidic region;

(ii) actuating at least one of the plurality of electrodes and directing thermal energy from the heating element to the microfluidic region, to subject the droplet to combined electrowetting and heating, wherein the combined action of electrowetting and heating induces formation of gaseous bubbles in the droplet; and (iii) moving the droplet along an electrode path in the microfluidic region in a first direction to detach the gaseous bubbles from the droplet.

2. The method according to claim 1, further comprising flowing a carrier fluid in a second direction opposite to or perpendicular to the first direction.

3. The method according to claim 1, wherein gaseous bubbles first form within about 3 seconds to about 30 seconds of heating and electrowetting.

4. The method according to claim 1, wherein gaseous bubbles first form within about 3 seconds to about 15 seconds of heating and electrowetting.

5. The method according to claim 1, wherein gaseous bubbles first form within about 3 seconds to about 10 seconds of heating and electrowetting.

6. The method according to claim 1, wherein the droplet is heated to a temperature from about 50° C. to about 90° C.

7. The method according to claim 1, wherein the droplet is heated to a temperature from about 60° C. to about 85° C.

8. The method according to claim 1, wherein the droplet is heated to a temperature from about 65° C. to about 80° C.

9. The method according to claim 1, wherein the droplet comprises a nucleic acid molecule.

10. The method according to claim 9, wherein the nucleic acid molecule is an oligonucleotide comprising 10 to 25 nucleotides.

11. The method according to claim 1, wherein the bottom plate further comprises a dielectric layer between the bottom hydrophobic layer and the plurality of electrodes.

12. The method of claim 1, wherein the switches are thin-film-transistors.

13. The method of claim 1, wherein the switches are electro-mechanical switches.

14. The method of claim 1, wherein the switches are configured to operate at about 0 V to about 30 V.

15. The method of claim 1, wherein the hydrophobic layer covers both the plurality of electrodes and the set of switches.

16. A system for degassing a droplet, comprising:

(i) a microfluidic device comprising:

a bottom plate comprising a plurality of electrodes operatively coupled to a set of switches, and including a bottom hydrophobic layer covering the plurality of electrodes;

a top plate comprising a top electrode and a top hydrophobic layer covering the top electrode;

a spacer separating the top and bottom plates and creating a microfluidic region between the top plate and bottom plate;

a controller operatively coupled to the set of switches and configured to provide an actuation voltage to at least a portion of the first plurality of electrodes, and a heating element configured to provide thermal energy to at least a portion of the microfluidic region; and (ii) a processor operably programmed to subject the droplet to a degassing method, the method comprising:

actuating at least one of the plurality of electrodes and directing thermal energy from the heating element to the microfluidic region, to subject the droplet to combined electrowetting and heating, wherein the combined action of electrowetting and heating induces formation of gaseous bubbles in the droplet; and moving the droplet along an electrode path in the microfluidic region in a first direction, to detach the gaseous bubbles from the droplet.

17. The system according to claim 16, wherein the processor is programmed to induce formation of gaseous bubbles within about 3 seconds to about 30 seconds of heating and electrowetting.

18. The system according to claim 16, wherein the processor is programmed to induce formation of gaseous bubbles within about 3 seconds to about 10 seconds of heating and electrowetting.

19. The system according to claim 16, further comprising a pumping device configured to flow a carrier fluid in a direction opposite to or perpendicular to the direction of motion of the droplet along an electrode path.

* * * * *